2,760,971
N - ARALKYL - N - (2 - CYANOALKYL)-HALOGENATED-ALKANAMIDES AND THEIR PREPARATION

Alexander R. Surrey, Albany, N. Y., assignor to Sterling Drug Inc., New York, N. Y., a corporation of Delaware No Drawing. Application February 19, 1954,
Serial No. 411,552

17 Claims. (Cl. 260—465)

This invention relates to N-aralkyl-N-(2-cyanoalkyl)-halogenated-alkanamides and to their preparation.

The N-aralkyl-N-(2-cyanoalkyl)-halogenated-alkanamides of my invention have the general formula

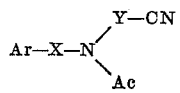

where Ar is a member selected from the group consisting of phenyl, naphthyl, biphenylyl, furyl, pyridyl and thienyl radicals, X is a lower alkylene radical having one to four carbon atoms, Y is a lower alpha,beta-alkylene radical having two to four carbon atoms and Ac is a lower halogenated-alkanoyl radical having one to four carbon atoms. These halogenated-alkanamides have valuable chemotherapeutic properties, for instance, amebacidal activity.

The radical Ar can have from one to three substituents such as halo, lower alkoxy, lower alkyl, lower alkylmercapto, lower alkylsulfonyl, nitro and di(lower alkyl)-amino. Furthermore, said substituents can be in any of the available positions of the Ar nucleus, and where more than one substituent, they can be the same or different and can be in any of the various position combinations relative to each other. The halo substituents include chloro, bromo, iodo and fluoro. The lower alkoxy, lower alkyl, lower alkylmercapto and lower alkylsulfonyl substituents, and the lower alkyl radicals of said di(lower alkyl)amino substituent, have preferably one to six carbon atoms, including such substituents as: methoxy, ethoxy, methylenedioxy, ethylenedioxy, n-propoxy, isopropoxy, isobutoxy, n-amoxy, n-hexoxy, and the like, when lower alkoxy; methyl, ethyl, n-propyl, isopropyl, n-butyl, isobutyl, 2-butyl, n-amyl, n-hexyl, and the like, when lower alkyl; methylmercapto, ethylmercapto, n-propylmercapto, isobutylmercapto, n-hexylmercapto, and the like, when lower alkylmercapto; methylsulfonyl, ethylsulfonyl, n-propylsulfonyl, isobutylsulfonyl, n-hexylsulfonyl, and the like, when lower alkylsulfonyl; and dimethylamino, ethylmethylamino, diisobutylamino, di-n-hexylamino, and the like, when di(lower alkyl)amino.

Preferred embodiments of my invention are those N,N-disubstituted-halogenated-alkanamides where Ar is a phenyl radical as described above.

The lower alkylene radical X has one to four carbon atoms, and includes such examples as

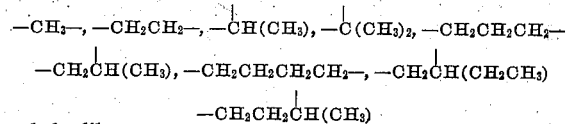

and the like.

The lower alpha,beta-alkylene radical Y has two to four carbon atoms, and includes such examples as

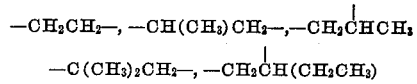

and the like.

The lower halogenated-alkanoyl radical Ac has one to four carbon atoms, and includes such examples as chloroformyl (chloromethanoyl), chloroacetyl (chloroethanoyl), iodoacetyl, fluoroacetyl, dichloroacetyl (dichloroethanoyl), dibromoacetyl, trichloroacetyl 2-chloropropanoyl (alpha-chloropropionyl), 3-bromopropanoyl, 2,2-diiodopropanoyl, 2-bromo-3-chloropropanoyl, 2,2-dichloropropanoyl, 2,2-difluoropropanoyl, 2,2,3-trichloropropanoyl (alpha,alpha,beta-trichloropropionyl), 2-chlorobutanoyl (alpha-chlorobutyryl), 3-bromobutanoyl, 2,2-dichlorobutanoyl, 3,4-dibromobutanoyl, 2,2,3-trichlorobutanoyl, 2,3,4-trichlorobutanoyl, and the like.

The compounds of my invention were prepared by reacting an N-(2-cyanoalkyl)-substituted-alkylamine of the formula, Ar—X—NH—Y—CN, with an acylating agent selected from the group consisting of those having the formula Ac-halogen and (Ac)₂O, where Ar, X, Y and Ac have the meanings given above. When a halogenated-alkanoyl halide, Ac-halogen, was used, the halide halogen, i. e., the halo radical attached to the carbonyl function, was preferably chloro, however, the other halo radicals, i. e., bromo, iodo and fluoro also can be used. Illustrations of the process of my invention are: the preparation of N-(2,4-dichlorobenzyl)-N-(2-cyanoethyl)dichloroacetamide by reacting N-(2-cyanoethyl)-2,4-dichlorobenzylamine with dichloroacetyl chloride; the preparation of N-(2,4 - dibromobenzyl)-N-(2-cyanopropyl)-2,3-dichloropropanamide by reacting N-(2-cyanopropyl)-2,4-dibromobenzylamine with 2,3-dichloropropanoyl chloride; and the preparation of N-(4-nitrophenethyl)-N-(2-cyanobutyl)-2,2-difluorobutanamide by reacting N-(2-cyanobutyl)-4-nitrophenethylamine with 2,2-difluorobutanoic anhydride. When a halogenated-alkanoic anhydride is used, the reaction can be carried out at room temperature or higher if necessary. When a halogenated-alkanoyl halide was used, the reaction was carried out preferably below room temperature, with chilling if necessary. In the preparation of a chloroformamide, an N-(2-cyanoalkyl)-substituted-alkylamine, preferably as its hydrochloride, is treated in refluxing toluene with phosgene, e. g., N-(3,4-dichlorobenzyl)-N-(2-cyanoethyl)chloroformamide by reacting N-(2-cyanoethyl) - 3,4 - dichlorobenzylamine with phosgene.

The intermediate N - (2 - cyanoalkyl)-substituted-alkylamines of the above given formula were prepared by reacting a substituted-alkylamine of the formula,

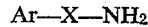

where Ar and X have the meanings given above, with a 2-alkenenitrile selected from the group consisting of acrylonitrile and alkylated-acrylonitriles. This preparation was carried out preferably by allowing the reactants to stand at room temperature for about forty-eight hours and then heating the reaction mixture on a steam bath for about one hour to drive off any unreacted acrylonitrile. Illustrations of the preparation of the intermediate N-(2-cyanoalkyl)-substituted-alkylamines are: the preparation of N-(2-cyanoethyl)-2,4-dichlorobenzylamine by reacting 2,4-dichlorobenzylamine with acrylonitrile; the preparation of N-(2-cyanopropyl)-3,4,5-tribromobenzylamine by reacting 3,4,5-tribromobenzylamine with alpha-methylacrylonitrile; the preparation of N-(2-cyanobutyl)-4-nitrophenethylamine with alpha-ethylacrylonitrile.

The following examples will further illustrate specific embodiments of the invention without, however, limiting it thereto.

EXAMPLE 1

A. *N-(2-cyanoalkyl)-substituted-alkylamines*

The preparation of the intermediate N-(2-cyanoalkyl)-substituted-alkylamines is illustrated by the following preparation of N-(2-cyanoethyl)-4-isopropylbenzylamine: A mixture of 22.4 g. of 4-isopropylbenzylamine and 8.0 g. of acrylonitrile was left at room temperature for two days. After the reaction mixture had been heated on a steam bath for one hour to drive off any unreacted acrylonitrile, the product was distilled, resulting in 24.9 g. of N-(2-cyanoethyl)-4-isopropylbenzylamine, B. P. 100–102° C. at 0.07 mm., $n_D^{26}$ 1.5161.

*Analysis.*—Calcd. for $C_{13}H_{18}N_2$: $N_{AP}$, 6.92. Found: $N_{AP}$, 6.85.

Here $N_{AP}$ means basic nitrogen content as determined by acetic-perchloric titration.

Other N-(2-cyanoethyl)-substituted-alkylamines that were prepared following the procedure described above for the preparation of N-(2-cyanoethyl)-4-isopropylbenzylamine using the appropriate substituted-alkylamine and acrylonitrile are given in Table I.

TABLE I

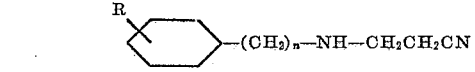

| R | n | B.P.(°C.)/mm. | Refractive Index | Analysis (percent) | |
|---|---|---|---|---|---|
| | | | | Calcd. | Found |
| 2,4-di-Cl | 1 | 158°/1.0 | | Cl 12.23 | 11.80 |
| 3,4-di-Cl | 1 | 160-170/0.8 | | | |
| H | 1 | 124/0.9 | $n_D^{24}$ 1.5353 | $N_{AP}$ 8.75 | 8.76 |
| 4-Cl | 1 | 120/0.07 | $n_D^{25}$ 1.5407 | $N_{AP}$ 7.20 | 7.07 |
| 3,4-O$_2$CH$_2$ | 1 | 125-7/0.03 | $n_D^{26}$ 1.5442 | | |
| 4-C$_3$H$_7$-i | 1 | 100-2/0.07 | $n_D^{26}$ 1.5161 | $N_{AP}$ 6.92 | 6.85 |
| 2,3-di-OCH$_3$ | 1 | 123-5/0.06 | $n_D^{27}$ 1.5273 | $N_{AP}$ 6.36 | 6.32 |
| 4-OC$_4$H$_9$-n | 1 | 136-8/0.05 | $n_D^{28}$ 1.5143 | N 12.06 | 12.01 |
| 4-CH$_3$ | 1 | 120-3/0.7 | $n_D^{27}$ 1.5244 | N 16.08 | 15.81 |
| 4-N(CH$_3$)$_2$ | 1 | 120-5/0.01 | $n_D^{27}$ 1.5555 | N 20.67 | 20.78 |
| 3,4-di-OCH$_3$ | 1 | 155-8/0.05 | $n_D^{28}$ 1.5392 | | |
| H | 2 | 130-3/0.6-0.9 | $n_D^{25}$ 1.5248 | $N_{AP}$ 8.04 | 8.18 |
| 4-Cl | 2 | 110/0.03 | $n_D^{26}$ 1.5358 | N 13.42 | 13.28 |
| 4-OCH$_3$ | 2 | 115-8/0.07 | $n_D^{28}$ 1.5278 | N 13.71 | 13.43 |
| 3-CH$_3$ | 2 | 126-30/0.5 | $n_D^{27}$ 1.5200 | $N_{AP}$ 7.44 | 7.42 |
| 2,4-di-Cl | 2 | 125-30/0.3 | $n_D^{27}$ 1.5485 | N 11.58 | 11.58 |

Other N-(2-cyanoalkyl)-substituted-alkylamines can be prepared according to the above procedure using the appropriate 2-alkenenitrile and substituted-alkylamine; such compounds include N-(2-cyanoethyl)-1-naphthylmethylamine, N-(2-cyanoethyl)-1-biphenylylmethylamine, N-(2-cyanoethyl)-4-n-hexylbenzylamine, N-(2-cyanoethyl)-2,4-diiodobenzylamine, N-(2-cyanoethyl-4-nitrophenethylamine, N-(2-cyanopropyl)-1-(3,4,5-triethoxyphenyl)ethylamine, N-(2-cyanopropyl)-4-(2,4-dichlorophenyl)butylamine, N-(2-cyanobutyl)-4-di-n-butylaminobenzylamine, N-(2-cyanoethyl)-4-n-hexoxybenzylamine, N-(2-cyanoethyl)-4-n-butylmercaptobenzylamine, N-(2-cyanoethyl)-4-n-butylsulfonylbenzylamine, N-(2-cyanoethyl)-4-nitrobenzylamine and the like.

B. N-(substituted-alkyl)-N-(2-cyanoalkyl)-halogenated-alkanamides

These N,N-disubstituted-halogenated-alkanamides were prepared by reacting an N-(2-cyanoalkyl)-substituted-alkylamine with an acylating agent selected from the group consisting of those having the formula Ac-halogen and (Ac)$_2$O, where Ac has the meaning given above. There follows an illustration of such a preparation using a halogenated-alkanoyl halide, Ac-halogen: A mixture of 20.2 g. of N-(2-cyanoethyl)-4-isopropylbenzylamine, 125 ml. of 1 N sodium hydroxide solution and 100 ml. of ethylene dichloride was cooled to 0° C. in an ice-salt bath, and 14.7 g. of dichloroacetyl chloride and 50 ml. of ethylene dichloride was added slowly with stirring, the temperature being kept below 5° C. After the addition had been complete, the mixture was stirred while allowed to warm to room temperature. The organic layer was separated, washed with 2 N hydrochloric acid and water, treated with decolorizing charcoal and filtered. The solvent was removed under reduced pressure yielding 26 g. of solid which was recrystallized once from isopropanol, yielding the product N-(2-cyanoethyl)-N-(4-isopropylbenzyl)dichloroacetamide, M. P. 107.9–111.6° C. (corr.).

*Analysis.*—Calcd. for $C_{15}H_{18}Cl_2N_2O$: C, 57.52; H, 5.79; Cl, 22.64. Found: C, 57.79; H, 5.52; Cl, 22.34.

The same product, N-(2-cyanoethyl)-N-(4-isopropylbenzyl)dichloroacetamide, can be prepared by reacting N-(2-cyanoethyl)-4-isopropylbenzylamine with dichloroacetic anhydride instead of dichloroacetyl chloride.

Other N-benzyl-N-(2-cyanoethyl)dichloroacetamides that were prepared following the procedure described above for the preparation of N-(4-isopropylbenzyl)-N-(2-cyanoethyl)dichloroacetamide, using the appropriate N-(2-cyanoethyl)benzylamine and acylating agent, e. g., dichloroacetyl chloride in most instances, are given in Table II.

TABLE II

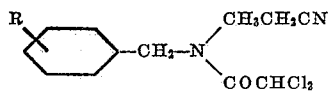

| R | M. P./°C. Corr. | Analysis (percent) | |
|---|---|---|---|
| | | Calcd. | Found |
| 2,4-di-Cl | 116.7-118.4 | Cl$_{KOH}$a, 20.86; N, 8.24 | 20.60; 8.25 |
| 3,4-di-Cl | 90.2-92.9 | Cl$_{KOH}$a, 20.86; N, 8.24 | 20.95; 8.23 |
| H | 77.0-79.5 | C, 53.15; H, 4.46; Cl, 26.15 | 53.02; 4.63; 26.26 |
| 4-Cl | (b) | C, 47.15; H, 3.63; Cl, 34.80 | 47.06; 3.60; 34.67 |
| 3,4-O$_2$CH$_2$ | 90.9-93.9 | C, 49.55; H, 3.84; N, 8.89 | 49.77; 3.76; 8.82 |
| 2,3-di-OCH$_3$ | 70.8-73.2 | C, 50.77; H, 4.87; N, 8.46 | 51.05; 5.19; 8.33 |
| 4-OC$_4$H$_9$-n | 93.9-95.5 | C, 55.99; H, 5.87; N, 8.16 | 56.20; 6.12; 8.12 |
| 4-CH$_3$ | 80.1-83.7 | C, 54.75; H, 4.95; N, 9.83 | 54.43; 5.22; 9.93 |
| 4-N(CH$_3$)$_2$ | 93-95.7 | C, 53.51; H, 5.46; N, 13.37 | 53.40; 5.45; 13.28 | a Cl$_{KOH}$ means hydrolyzable chlorine as determined by hydrolysis with potassium hydroxide followed by gravimetric or amperometric method.

b B. P. 180-5° C. at 0.03 mm.; solidified on standing.

Other N-(substituted-alkyl)-N-(2-cyanoalkyl)-halogenated-alkanamides that can be prepared according to the above procedure used to prepare N-(4-isoproylbenzyl)-N-(2-cyanoethyl)dichloroacetamide using the appropriate N-(2-cyanoalkyl)-substituted-alkylamine and halogenated-alkanoylating agent include the following: N-(1-naphtheylmethyl)-N-(2-cyanoethyl)dichloroacetamide, N-(1-biphenylylmethyl)-N-(2-cyanoethyl)dichloroacetamide, N-(2,4-dichlorobenzyl)-N-(2-cyanoethyl)dibromoacetamide, N-(3,4-dibromobenzyl)-N-(2-cyanoethyl)bromochloroacetamide, N-(2,4-dichlorobenzyl)-N-(2-cyanoethyl)diiodoacetamide, N-(3,4-dichlorobenzyl)-N-(2-cyanoethyl)difluoroacetamide, N-(4-n-hexylbenzyl)-N-(2-cyanoethyl)-2,2-dichloropropanamide, N-

(2,4-diiodobenzyl)-N-(2-cyanoethyl) - 2,2 - diiodopropanamide, N-(4-nitrophenethyl)-N-(2-cyanoethyl)-2-bromo-3 - chloropropanamide, N - [1 - (3,4,5 - triethoxyphenyl)-ethyl]-N-(2-cyanopropyl) - 2,2,3 - trichloropropanamide, N-[4-(2,4-dichlorophenyl)butyl] - N - (2 - cyanopropyl)-2,2-dichlorobutanamide, N-(4-di-n-butylaminobenzyl)-N-(2-cyanobutyl)-3,4-dibromobutanamide, N-(4-n - hexoxybenzyl)-N-(2-cyanoethyl)-2,2,3 - trichlorobutanamide, N-(2,4-dichlorobenzyl)-N-(2-cyanoethyl)-2,3,4 - tricholorobutanamide, N-(4-n-butylmercaptobenzyl)-N-(2 - cyanoethyl)dichloroacetamide, N-(4-n-butylsulfonylbenzyl)-N-(2-cyanoethyl)dichloroacetamide, N-(4-nitrobenzyl) - N-(2-cyanoethyl)dichloroacetamide, and the like.

N-(phenethyl)-N - (2 - cyanoethyl)dichloroacetamides prepared according to the procedure described above for the preparation of N-(4-isopropylbenzyl)-N-(2-cyanoethyl)dichloroacetamide but using the appropriate phenethylamines in place of 4-isopropylbenzylamine are given in Table III.

TABLE III

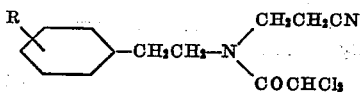

| R | M. P./°C. Corr. | Analysis (percent) | |
|---|---|---|---|
| | | Calcd. | Found |
| H | 59.7–61.6 | C, 54.73; H, 4.95; Cl, 24.86 | 55.00; 5.18; 25.49 |
| 4-Cl | 84.9–93.3 | C, 48.85; H, 4.10; Cl$_{KOH}$, 22.19 | 48.63; 3.96; 22.24 |
| 4-OCH$_3$ | 56.5>66 | C, 53.35; H, 5.12; N, 8.89 | 53.20; 5.25; 8.84 |
| 4-CH$_3$ | 64.3–68.0 | C, 56.20; H, 5.39; N, 9.37 | 56.29; 5.46; 9.31 |
| 2,4-di-Cl | 92.3–95.6 | C, 44.10; H, 3.42; N, 7.92 | 43.79; 3.37; 7.87 |

EXAMPLE 2

*N-(substituted-alkyl)-N-(2-cyanoalkyl)trihaloacetamides*

These trihaloacetamides were prepared by reacting an N-(2-cyanoalkyl)-substituted-alkylamine with a trihaloacetylating agent, including a trihaloacetyl halide or a trihaloacetic anhydride. This preparation was carried out following the procedure described above for Example 1B, for example, using 8 g. of N-(2-cyanoethyl)-3,4-dichlorobenzylamine and 6.5 g. of trichloroacetyl chloride, there was obtained N-(3,4-dichlorobenzyl)-N-(2-cyanoethyl)trichloroacetamide, M. P. 94.8–98.7° C. (corr.) when recrystallized from isopropanol.

*Analysis.*—Calcd. for C$_{12}$H$_9$Cl$_5$N$_2$O: Cl, 47.33; N, 7.48. Found: Cl, 47.48; N, 7.55.

Also prepared according to the foregoing procedure were N-(4-chlorobenzyl)-N-(2-cyanoethyl)trichloroacetamide, M. P. 84.8–86.9° C. (corr.) [*Analysis.*—Calcd. for C$_{12}$H$_{10}$Cl$_4$N$_2$O: C, 42.38; H, 2.97; N, 8.24. Found: C, 42.96; H, 2.63; N, 8.29]; and N-(4-isopropylbenzyl)-N-(2-cyanoethyl)trichloroacetamide, M. P. 47.1–50.2° C. (corr.) [*Analysis.*—Calcd. for C$_{15}$H$_{17}$Cl$_3$N$_2$O: C, 51.82; H, 4.93; Cl, 30.60. Found: C, 51.97; H, 4.94; Cl, 30.50.

Other N-(substituted-alkyl)-N-(2 - cyanoalkyl)trihaloacetamides that can be prepared according to the above procedure using the appropriate N-(2-cyanoalkyl)-substituted-alkylamine and halogenated-alkanoylating agent include the following: N-(2,4-dichlorobenzyl)-N-(2-cyanoalkyl)trichloroacetamide, N-(4-n - butoxybenzyl) - N-(2-cyanoethyl)trichloroacetamide, N - (3,4 - dibromobenzyl)-N - (2 - cyanopropyl)tribromoacetamide, N - (4-n-hexylbenzyl) - N - (2 - cyanobutyl)trichloroacetamide, N-3,4,5 - triiodobenzyl) - N - (2 - cyanoethyl)trichloroacetamide, N-(2,4-dichlorophenethyl)-N-(2 - cyanoethyl)trichloroacetamide, and the like.

EXAMPLE 3

*N-(substituted-alkyl)-N-(2-cyanoalkyl)monohaloalkanamides*

These monohaloalkanamides were prepared by reacting an N-(2-cyanoalkyl)-substituted-alkylamine with a monohaloalkanoylating agent including a monohaloalkanoyl halide or a monohaloalkanoic anhydride. This preparation is illustrated by the following preparation of N-(2,4-dichlorobenzyl)-N-(2-cyanoethyl)chloroacetamide using chloroacetyl chloride: A solution of 10 g. of chloroacetyl chloride in 25 ml. of ethylene dichloride was slowly added with stirring to a cooled mixture (below 5° C.) of 17.2 g. of N-(2-cyanoethyl)-2,4-dichlorobenzylamine, 100 ml. of 1 N sodium hydroxide solution and 125 ml. of ethylene dichloride. When the addition had beed completed, stirring was continued while the mixture was allowed to warm up to room temperature. The layers were separated and the organic layer was washed with 2 N hydrochloric acid, water and then dried. Decolorizing charcoal was added to the dried solution, the mixture filtered and the filtrate evaporated under reduced pressure. There remained 9.5 g. of oily material which solidified on cooling. This product, N-(2,4-dichlorobenzyl)-N-(2-cyanoethyl)chloroacetamide, melted at 68.5–69.9° C. (corr.).

*Analysis.*—Calcd. for C$_{12}$H$_{11}$Cl$_3$N$_2$O: C, 47.16; H, 3.63; N$_K$, 9.16. Found: C, 47.25; H, 3.63; N$_K$, 9.14.

Also prepared according to the foregoing procedure was N-(3,4-dimethoxybenzyl)-N - (2 - cyanoethyl)chloroacetamide, M. P. 74.4–79.1° C. (corr.).

*Analysis.*—Calcd. for C$_{14}$H$_{17}$ClN$_2$O$_3$: C, 56.64; H, 5.77; Cl, 11.96. Found: C, 56.55; H, 5.42; Cl, 12.25.

Other N-(substituted-alkyl)-N - (2 - cyanoalkyl)monohaloalkanamides that can be prepared according to the above procedure include the following: N-(3,4-dichlorobenzyl)-N - (2 - cyanopropyl)chloroacetamide, N - (4 - n-butoxybenzyl)-N-(2-cyanoethyl) - 3 - chloropropanamide, N-(2,4-dichlorobenzyl)-N-(2-cyanoethyl)-4- bromobutanamide, N-(3,4-dibromobenzyl)-N-(2 - cyanoethyl)bromoacetamide, N-(4-n-hexylbenzyl)-N-(2-cyanobutyl)fluoroacetamide, N-(2,4-diiodobenzyl)-N-(2 - cyanoethyl)iodoacetamide, N-(2,4-dichlorophenethyl)-N-(2-cyanoethyl)-chloroacetamide, and the like.

EXAMPLE 4

A. N-(2-cyanoethyl)furfurylamine

A mixture of 9.7 g. of furfurylamine (2-furylmethylamine) and 6.4 g. of acrylonitrile was left at room temperature for one week. The reaction mixture was then heated on a steam bath for thirty minutes and distilled, yielding 12 g. of N-(2-cyanoethyl)furfurylamine, boiling at 97–99° C. at 0.9 mm. Hg, $n_D^{27}$ 1.4836.

*Analysis.*—Calcd. for C$_8$H$_{10}$N$_2$O: N$_{AP}$, 18.64. Found: N$_{AP}$, 18.38.

Other N-(2-cyanoethyl)-substituted-alkylamines that can be prepared following the above procedure are N-(2-cyanoethyl)-2-thienylmethylamine, N-(2-cyanoethyl)-2-pyridylmethylamine, N-(2-cyanoethyl)-3-pyridylmethylamine and N-(2-cyanopropyl)-5-chloro-2-pyridylmethylamine.

B. N-(2-cyanoethyl)-N-(furfuryl)dichloroacetamide

A mixture of 10 g. of N-(2-cyanoethyl)furfurylamine, 75 ml. of 1 N sodium hydroxide solution and 75 ml. of ethylene dichloride was cooled (below 5° C.) and stirred while 9.9 g. of dichloroacetyl chloride in 25 ml. of ethylene dichloride was added slowly. When the addition had been completed, stirring was continued while the mixture was allowed to warm up to room temperature. The ethylene dichloride layer was separated and washed respectively with 2 N hydrochloric acid and water, and dried. Decolorizing charcoal was added to the dried solution, the resulting mixture filtered and the filtrate evaporated under reduced pressure, yielding a light brown oily material that was further dried at 60–70° C. (corr.) at 0.05 mm. Hg for two hours. There was thus obtained 13.5 g. of N-(2-cyanoethyl)-N-(furfuryl)dichloroacetamide.

*Analysis.*—Calcd. for $C_{10}H_{10}Cl_2N_2O_2$: C, 45.99; H, 3.86; N, 10.73. Found: C, 45.44; H, 4.16; N, 10.59.

Other N-(substituted-alkyl)-N-(2-cyanoethyl)dichloroacetamides that can be prepared according to the above procedure using the appropriate reactants are N-(2-cyanoethyl)-N-(2-thienylmethyl)dichloroacetamide, N-(2-cyanoethyl)-N-(2-pyridylmethyl)dichloroacetamide, N-(2-cyanoethyl)-N-(3-pyridylmethyl)dichloroacetamide and N-(2-cyanopropyl)-N-(5-chloro-2-pyridylmethyl)dichloroacetamide.

The N-aralkyl-N-(2-cyanoalkyl)-halogenated-alkanamides of the foregoing examples when administered orally to hamsters infected with *Endamoeba criceti* were found to completely clear the animals at drug levels below 200 mg. per kg. of body weight. Some of the compounds, for instance, N-(2,4-dichlorobenzyl)-N-(2-cyanoethyl)-dichloroacetamide, N-(3,4-dichlorobenzyl)-N-(2-cyanoethyl)dichloroacetamide, N-benzyl-N-(2-cyanoethyl)dichloroacetamide, N-(4-methylbenzyl)-N-(2-cyanoethyl)-dichloroacetamide and N-(4-chlorobenzyl)-N-(2-cyanoethyl)trichloroacetamide, have $ED_{50}$ values below 50 mg. per kg. of body weight, $ED_{50}$ meaning the effective dose necessary to clear 50% of the hamsters of the amebic infection.

I claim:
1. A compound having the formula

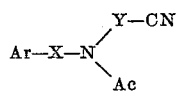

where Ar is a member selected from the group consisting of phenyl, naphthyl, diphenylyl, furyl, pyridyl and thienyl radicals and such radicals substituted by from one to three substituents selected from the group consisting of halo, lower alkoxy, lower alkyl, lower alkylmercapto, lower alkylsulfonyl, nitro and di(lower alkyl)amino, X is a lower alkylene radical having one to four carbon atoms, Y is a lower alpha,beta-alkylene radical having two to four carbon atoms and Ac is a lower halogenated-alkanoyl radical having one to four carbon atoms.

2. A compound having the formula

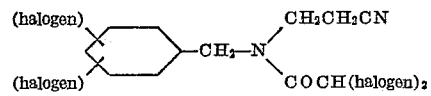

3. A compound having the formula

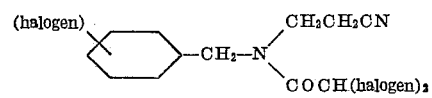

4. A compound having the formula

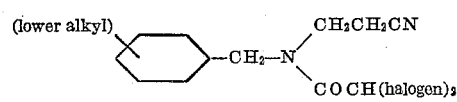

5. A compound having the formula

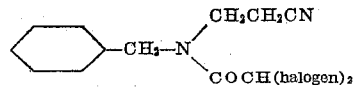

6. A compound having the formula

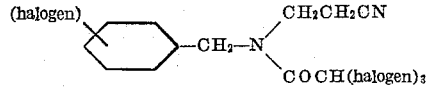

7. N-(2,4-dichlorobenzyl)-N-(2 - cyanoethyl)dichloroacetamide.
8. N-(3,4-dichlorobenzyl)-N-(2 - cyanoethyl)dichloroacetamide.
9. N-(4-methylbenzyl)-N-(2 - cyanoethyl)dichloroacetamide.
10. N-benzyl-N-(2-cyanoethyl)dichloroacetamide.
11. N-(4-chlorobenzyl)-N-(2-cyanoethyl)trichloroacetamide.
12. A process for the preparation of a compound having the formula

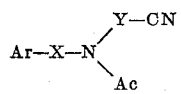

where Ar is a member selected from the group consisting of phenyl, naphthyl, biphenylyl, furyl, pyridyl and thienyl radicals and such radicals substituted by from one to three substituents selected from the group consisting of halo, lower alkoxy, lower alkyl, lower alkylmercapto, lower alkylsulfonyl, nitro and di(lower alkyl)amino, X is a lower alkylene radical having one to four carbon atoms, Y is a lower alpha,beta-alkylene radical having two to four carbon atoms and Ac is a lower halogenated-alkanoyl radical having one to four carbon atoms, which comprises reacting a compound of the formula,

with an acylating agent selected from the group consisting of those having the formula Ac-halogen and $(Ac)_2O$.

13. A process for the preparation of a compound having the formula

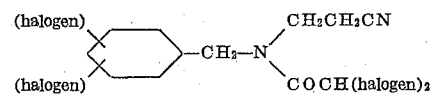

which comprises reacting the corresponding N-(2-cyanoethyl)dihalobenzylamine with a dihaloacetyl halide.

14. A process for the preparation of a compound having the formula

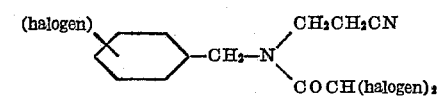

which comprises reacting the corresponding N-(2-cyanoethyl)halobenzylamine with a dihaloacetyl halide.

15. A process for the preparation of a compound having the formula

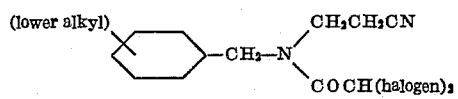

which comprises reacting the corresponding N-(2-cyanoethyl)alkylbenzylamine with a dihaloacetyl halide.

16. A process for the preparation of a compound having the formula
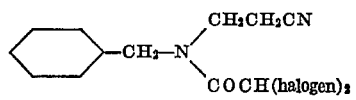
which comprises reacting N-(2-cyanoethyl)benzylamine with a dihaloacetyl halide.
17. A process for the preparation of a compound having the formula
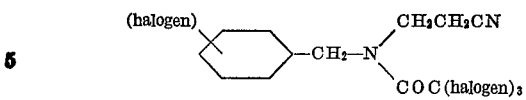
which comprises reacting the corresponding N-(2-cyanoethyl)halobenzylamine with a trihaloacetyl halide.
No references cited.